United States Patent Office 3,835,079
Patented Sept. 10, 1974

3,835,079
HOT MELT COMPOSITIONS COMPRISING STYRENE-ISOBUTYLENE COPOLYMER, WAX, AND A PRIMARY RESIN
Frank Scardiglia, Arlington Heights, and Takeo Hokama, Chicago, Ill., assignors to Velsicol Chemical Corporation, Chicago, Ill.
No Drawing. Application Oct. 29, 1970, Ser. No. 85,297, now Patent No. 3,757,000, which is a continuation-in-part of abandoned application Ser. No. 728,332, May 10, 1968. Divided and this application Jan. 22, 1973, Ser. No. 325,500
Int. Cl. C08f 45/52
U.S. Cl. 260—28.5 A                    13 Claims

ABSTRACT OF THE DISCLOSURE

A solid, homogeneous and essentially random copolymer of styrene and isobutylene having a number average molecular weight of from about 1000 to about 4000, a heterogeneity index of from about 1.50 to about 2.25 and a styrene content of from about 40 to about 90 weight percent with its higher molecular weight fractions having a higher styrene content than the average styrene content of the copolymer.

---

This is a division of application Ser. No. 85,297, filed Oct. 29, 1970, now 3,757,000, which is a continuation-in-part of our copending application Ser. No. 728,332, filed May 10, 1968, now abandoned.

This invention relates to new copolymers of styrene and isobutylene to preparational methods therefor and to novel resinous compositions containing such copolymers. More particularly, this invention relates to homogeneous highly random low molecular weight copolymers of styrene and isobutylene which are obtained according to a specific preparational method.

The polymerization of styrene and isobutylene to form copolymers is well known and several classes of these copolymers have been prepared utilizing different preparational conditions and procedures. Most of these copolymers are of the low temperature type, that is, they have been prepared at polymerization temperatures below 0° C., usually below —40° C. and frequently within the range of —80° C. to —150° C. These low temperature polymers are typically characterized by a combined styrene content usually having an upper limit of about 65 to 70 weight percent and by a high molecular weight ranging from about 100,000 to 500,000 in terms of Staudinger units which is necessary for the obtainment of their desired properties of elasticity and high tensile strength. Other copolymers have been prepared at temperatures above 0° C. ranging up to as high as 200° C. These copolymers are characterized by a relatively low combined styrene content usually ranging up to about 40 weight percent and, more significantly, by their normally liquid or oily nature which renders them useful as lubricants or lubricating oil, and blending agents. It has now been discovered that another class of novel copolymers of styrene and isobutylene can be prepared at polymerization temperatures above 0° C. by utilizing a specific, preparational method which produces such copolymers in almost theoretical yield and moreover in a convenient and highly desirable industrial manner.

Accordingly, an object of this invention is to provide a new class of copolymers of styrene and isobutylene. Another object is to provide a unique preparational method for obtaining this class of copolymers. A further object is to provide a method for producing these copolymers in high yield and in a particularly desirable industrial manner. A still further object is to provide novel resinous compositions containing these copolymers which are particularly useful as hot melt resins or pressure sensitive adhesives. These and other objects of this invention will be apparent from the following further detailed description thereof.

The copolymers of this invention are highly homogeneous and essentially random, normally solid copolymers of styrene and isobutylene which have a low molecular weight, a broad molecular weight distribution and a high weight content of styrene. These copolymers are further characterized by a combination of several other properties or characteristics such as a particular heat softening point range, optical clarity, thermal stability and a high degree of solubility in solvents and compatibility with other polymers and polymer systems. Due to this desirable combination of characterizing properties, the copolymers of this invention are particularly useful for a variety of polymeric applications. For example, the copolymers can be used as modifiers to improve the physical properties of other polymers or polymer systems and as components of resinous compositions such as hot melt resins or pressure sensitive adhesives.

The copolymers of this invention are capable of having a high content of styrene ranging up to as high as 90 or more, usually 70 to 80 weight percent. Yet they are still highly homogeneous at such levels in that the copolymers are composed essentially of styrene and isobutylene copolymer units to the substantial exclusion of either styrene or isobutylene homopolymer units. The styrene content of the copolymer ranges from as low as about 40 to as high as about 90 weight percent with the corresponding isobutylene content ranging from about 60 to about 10 weight percent. The preferred copolymers, however, contain a relatively high content of styrene within the range of from about 45 to about 85 weight percent styrene with the particular amount within this range being dependent upon the ultimate intended use of the copolymer. For example when the copolymer is intended for use in hot melt resins, the preferred styrene content ranges from about 60 to about 85 weight percent and when it is intended for use in pressure sensitive adhesives the preferred styrene content ranges from about 40 to 75 weight percent styrene. This high concentration of styrene is usually difficult to achieve especially when copolymers of highly uniform composition are desired consisting essentially of styrene and isobutylene copolymer units to the substantial exclusion or absence of any styrene homopolymer units. Nevertheless, such uniform, highly homogeneous copolymers are readily achieved in essentially quantitative yields when prepared according to the preparational method of this invention as hereafter described.

The molecular weight of the copolymers of this invention in contradistinction to the typical copolymers of styrene and isobutylene is very low and moreover must be within a limited range in order that the copolymers possess the desired set of properties. As used herein molecular weight is described both in terms of the weight average molecular weight $\overline{M}_w$, and the number average molecular weight $\overline{M}_n$. However, unless specified to the contrary, when used herein and in the appended claims, molecular weight will mean the number average molecular weight $\overline{M}_n$. The significance of these conventional molecular weight terms as well as methods for their determination are more fully described in the "Structures of Polymers," M. I. Miller, Reinhold, New York, 1966. In general, the molecular weight of the copolymers of this invention can range from about 1000 to about 4000. A more limited molecular weight range, however, which is readily achieved by utilization of the preparational method of this invention is preferred and ranges from about 1200 to 3500. This latter limited range is particularly preferred in that the copolymers having this low molecular weight range are especially suitable for use in various applications such as components of resinous compositions useful as hot melt resins or pressure sensitive adhesives.

In addition to a limited, low molecular weight range, the copolymers of this invention have a broad molecular weight distribution. This distribution of the molecular weights of the copolymer may be described conventionally in terms of a heterogeneity index which is defined as the ratio of the weight average molecular weight to the number average molecular weight, $\overline{M}_w/\overline{M}_n$. Usually, the heterogeneity index, $\overline{M}_w/\overline{M}_n$, for the copolymers can range from about 1.50 to about 2.25. Typically, however, for copolymers having the preferred molecular weight, the heterogeneity index ranges from about 1.65 to about 2.15, especially for copolymers intended for use as components of resinous compositions.

As indicated, the copolymers of this invention are characterized by a high degree of randomness, that is, the copolymers consist essentially of basic repeating units of the following formula:

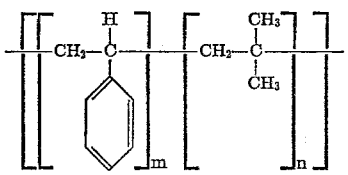

wherein $m$ and $n$ are integers from 1 to about 15, and the styrene and isobutylene moieties are distributed in an essentially random manner. Furthermore, the above basic repeating unit is located along the polymer chain in an essentially random distribution. The total number of described basic repeating units in the copolymer is such that the number average molecular weight is from about 1000 to about 4000. Thus the polymers of this invention do not contain long sequences of styrene or isobutylene units, nor do they contain long sequences of alternating styrene and isobutylene units. This distinguishes the copolymers of the present invention from block-type copolymers which essentially contain long sequences of styrene and isobutylene units along their molecular chain. It also distinguishes the copolymer from a graft-type copolymer where repeating units of either styrene or isobutylene are attached to a backbone chain of the other. In addition to indicating the random nature of the copolymer of this invention the above formula also serves to illustrate the specific nature of the copolymer in that there are substantially no ring alkylated styrene residues in the polymer arising from an in situ alkylation of the styrene by the isobutylene and further that the polymerization of the isobutylene unit takes place so that there are two methyl groups and not only one perpendicular to the molecular chain.

The styrene-isobutylene copolymers of this invention are further characterized in that their high molecular weight fractions have a higher styrene content than the average styrene content of the copolymer and their lower molecular weight fractions correspondingly have a lower styrene content than the average styrene content of the copolymer. Essentially, the styrene content of the higher molecular weight fractions will be up to about 5 weight percent higher than the average styrene content of the copolymer and the lower molecular weight fractions will have a styrene content up to about 5 weight percent less than the average styrene content of the copolymer.

The styrene-isobutylene copolymers of this invention, as indicated, are normally solid materials and have relatively high heat softening points. As measured by the ring and ball method, the heat softening point of the copolymers can range from about 125° F. to about 225° F. A more limited range of from about 130° F. to about 225° F. and especially from about 190° to 225° F. is preferred, however, for maximizing the usefulness of the copolymers in such applications as polymer modifiers or components of resinous compositions used for hot melt resins. A further and important characterizing property of the copolymers of this invention is that they have good thermal stability and are stable against chemical decomposition at temperature above 350° C. Accordingly, they can be suitably employed in applications without decomposition where high temperatures are likely to exist or occur. This is particularly important on such polymer applications as hot melt resinous compositions which are conveniently subjected to elevated temperatures during their application.

The copolymers of this invention also possess and are characterized by a high degree of optical clarity. This in turn is partially a function of the compositional uniformity of the copolymers in that they are composed essentially of copolymer units without substantial proportions of any homopolymer units. In fact, the optical clarity of the copolymers can be used to a certain degree as an indicator of their highly homogeneous nature. The optical clarity of the copolymers is manifested by high light transmission in that the copolymers permit light to pass through film-castings of the copolymer without substantial proportions of the light being absorbed or reflected. For example, normally printed matter can be readily read through a film casting of the copolymer having a thickness of 0.5 inch.

As indicated, the copolymers have the important property and are further characterized by a high degree of solubility in various solvents such as hexane, mineral spirit, or aliphatic hydrocarbons. In addition to this property of high solubility, the copolymers can be further characterized as being highly compatible with a variety of different polymers and copolymer systems. For example, the copolymer, when blended with such polymers as styrene-butadiene rubbers, acrylics or alkyds form homogeneous, stable, one phase polymer systems.

While the copolymers of this invention can be defined by reference to the above characterizing properties such as molecular weight, molecular weight distribution, randomness and compositional homogeneity, as well as softening points, such properties are a function of or interrelated to their specific method of preparation. Accordingly, the copolymers can, in addition to such properties, also be defined or characterized by references to such method of preparation. In preparing the copolymers according to this invention, a specific preparational method should be utilized in order that all of the above described properties be obtained especially in the preferred ranges. Utilization of such method, moreover, not only permits the obtainment of the desired copolymers, but in addition achieves such result with almost theoretical conversions and in a particular convenient and desirable industrial manner. This preparational method involves an interrelated combination of processing features which basically comprise an elevated polymerization temperature, a particular catalyst system and a certain mode of conducting the polymerization reaction. This method is effected, in general, by gradually bringing the styrene and isobutylene into reactive contact, in the presence of a hydrocarbon polymerization solvent, with a catalyst system of a primary catalyst and a co-catalyst while maintaining an elevated polymerization temperature.

The catalyst system which is utilized in the preparation is composed of a primary catalyst and a co-catalyst which are maintained in a specific, relative proportion. Both the selection of the primary catalyst and the co-catalyst and their relative proportions in the catalyst system are important to the success of the method in producing high yields of copolymers having all of the ultimately desired properties. The primary catalyst can consist of at least one alkyl aluminum dihalide wherein the alkyl portion can have from 1 to about 5 carbon atoms including, for example, such groups as methyl, ethyl, propyl, and butyl and the halide portion can be a halogen atom having an atomic weight within the range of from about 35 to about 80 including, for example, chlorine and bromine. Of the various alkyl aluminum dihalides which can be employed, the preferred primary catalyst is ethyl aluminum dichloride.

The co-catalyst utilized in combination with the primary catalyst in the catalyst system comprises at least one material selected from the group consisting of water, an alkyl halide, a hydrogen halide or an alcohol. Examples of these co-catalysts include alcohols such as alkanols having from 1 to about 5 carbon atoms in the alkyl portion of the molecule, such as ethyl alcohol, propyl alcohol, tertiary butyl alcohol or mixtures thereof; secondary or tertiary alkyl halides where the alkyl portion contains from about 3 to about 5 carbon atoms and where the halide portion is the same as defined above, such as butyl chloride, propyl chloride or pentyl chloride; or a hydrogen halide such as hydrogen chloride or hydrogen bromide. Of the various catalysts which can be employed, an alkanol such as tertiary butyl alcohol or an alkyl halide such as tertiary butyl chloride and especially water are preferred and particularly when used in combination with the preferred primary catalyst, ethyl aluminum dichloride.

As indicated, the relative proportions or ratio of the co-catalyst to catalyst in the catalyst system is important in achieving copolymers having the desired set of properties. While this ratio can vary depending upon such factors as the particular catalyst and co-catalyst used, it should be maintained within certain limits if copolymers of the desired properties such as molecular weight and molecular weight distribution are to be achieved. Generally, the co-catalyst should be present in the catalyst system within a range of from about 2 to 30 mol percent based upon the mols of the primary catalyst present. A more limited range of from about 2.5 to 15 or about 5 to about 10 mol percent is preferred for such co-catalysts as water and particularly when used with the preferred, primary catalyst, ethyl aluminum dichloride. The quantity of the primary catalyst used in the catalyst system which in turn determines the quantity of co-catalyst can also be varied. The particular amount used is dependent upon such factors as the particular primary catalyst, the co-catalyst and the polymerization temperature. Generally, the quantity of the primary catalyst can range from about 0.20 to about 1.5 weight percent based upon the combined weight of the styrene and isobutylene monomers. A more limited range of about 0.25 to 1.2 or about 0.5 to about 1.0 is preferred, however, when employing catalyst systems containing ethyl aluminum dichloride in combination with co-catalysts such as water, alkyl halides or alkanols.

In preparing the catalyst system, the co-catalyst and the primary catalyst can be admixed in the desired ratio prior to the polymerization. More preferably, it can be prepared in the presence of the solvent just prior to polymerization by simply adding the appropriate quantities of catalyst and co-catalyst to the solvent with mixing. The primary catalyst itself can also be prepared in situ during or just prior to the polymerization by combining the necessary materials to form the desired alkyl aluminum dihalide. For example, aluminum chloride can be admixed with diethyl aluminum chloride in the appropriate proportion to form the active, preferred ethyl aluminum dichloride catalyst in situ. Generally, however, it is preferable to add the primary catalyst as a relatively pure compound to the solvent together with the co-catalyst just prior to the polymerization.

The temperature utilized in effecting the polymerization, as indicated, is unusually high for the polymerization of styrene and isobutylene to form normally solid copolymers. Nevertheless, this high temperature is a novel and important feature of the preparational method of this invention. Utilization of such high temperature in combination with the catalyst system as well as with the mode of conducting the polymerization permits the attainment of the unique copolymers of this invention having all of the desirable properties such as low molecular weight and a broad molecular weight distribution. Moreover, employment of this elevated temperature allows the polymerization to be conducted in a highly convenient and desirable manner in that the extensive cooling, critical in effecting the low temperature polymerization of styrene and isobutylene, is unnecessary. The polymerization temperature can range from about 10° to about 50° C. with the specific temperature utilized within this range being dependent upon such factors as the catalyst system employed, the solvent and the ultimately desired properties of the copolymer. Usually, however, a more limited temperature range is preferred of from about 15° to about 25° C. or about 20° C. especially when preparing the preferred class of copolymers according to this invention.

The hydrocarbon solvent used to effect the polymerization can include a wide class of hydrocarbon polymerization solvents. The particular solvent employed in the polymerization, however, will affect the ultimate properties of the copolymer produced. Accordingly, it is important to select a solvent or combination of solvents which provides a copolymer having the ultimately desired properties. The solvents which can be used individually or in combination include aliphatics such as alkanes containing from about 6 to about 10 carbon atoms per molecule such as hexane or heptane and aromatics such as benzene or alkylated benzenes such as toluene, xylene or ethyl benzene. Of the various solvents which can be utilized, preferred solvents are alkanes such as hexane or heptane or mixtures thereof. The quantity of solvent employed can be varied but there should at least be a quantity of solvent present sufficient to provide a readily stirrable reaction mixture. Typically when using solvents such as hexane this amount ranges from about 0.5 to about 2 weight parts or preferably equal weight parts of solvent per one weight part of the combined styrene and isobutylene charge.

In conducting the preparational method, another important processing feature in combination with the features of the catalyst system and elevated polymerization temperature is the particular mode used to bring the styrene and isobutylene into reactive contact with the catalyst system. It is most important that the styrene and isobutylene be gradually contacted with the catalyst system in the presence of the solvent if the copolymers of the desired properties are to be achieved. This contacting is preferably effected by gradually adding both the styrene and isobutylene to the solvent containing the catalyst system while maintaining the desired polymerization temperature. In gradually adding the styrene and isobutylene, preferably admixed in a single feed stream, the time required to complete the addition will vary depending upon such factors as the particular catalyst system and the polymerization temperature utilized and to a lesser degree upon the scale of the reaction. Generally, however, the styrene and isobutylene should be added at a rate adjusted so that they are substantially completely polymerized upon contact with the catalyst system leaving substantially no unreacted monomer in the reaction mixture. Typically, this addition time can range from about 0.10 to 2 hours with addition times of from about 0.5 to 1.5 or about 1.0 hours being preferred for maximizing the desired properties of the copolymers produced. The charge stream of styrene and isobutylene gradually added to the mixture of solvent and catalyst system can contain styrene in an amount of from about 40 to 90 weight percent. However, when preparing the preferred copolymers according to this invention, the charge contains styrene in an amount ranging from about 45 to 85 weight percent.

The polymerization method of this invention can be conducted in a batch, semi-batch or continuous operation.

A batch operation is usually suitable, however, and one illustrative procedure involves gradually adding a single stream of styrene and isobutylene monomers, admixed in the desired weight ratio, to the stirred solvent containing the appropriate catalyst system. The gradual addition of the styrene and isobutylene is regulated so that substantially all of the styrene and isobutylene are polymerized upon contact with the catalyst system leaving substantially no unreacted monomer in the reaction mixture. During the addition, the temperature of the exothermic reaction is maintained within the desired range by utilizing appropriate cooling means. When the addition of the monomers is complete, the coplymer product can then, if desired, be recovered from the reaction mixture. It is generally desirable, however, to leave the coplymer in the recation mixture in the presence of the catalyst system at the polymerization temperature for a residence period sufficient to insure total, uniform polymerization. The length of this residence period can range from only a few minutes to one hour or more. Typically, residence periods ranging from about 0.25 to 3 hours are sufficient with about 0.75 to 2.5 or about 1 hour usually being preferred. After the copolymer has been in contact with the catalyst system for a sufficient residence period it can be removed from the reaction mixture and purified according to several different procedures. Advantageously, the removal procedure involves first eliminating the catalyst system from the reaction mixture by adding a solid adsorbent to adsorb the catalyst and the solids can then be eliminated as a solid filtrate. Alternatively acidic or basic materials can be added to form water soluble adducts of the catalyst. Such adducts can then be removed by water washing of the reaction mixture. After the catalyst system has been eliminated by one of the above procedures or a combination thereof, the solvent and any impurities formed in the polymerization can be readily removed from the reaction mixture by distillation at reduced pressure, leaving the desired copolymer in high yield.

As indicated, the styrene-isobutylene copolymers of this invention are useful for a variety of different polymeric applications. One especially useful application is utilization of the copolymers as components of resinous compositions used for hot melt resins. These hot melt resinous compositions are typcially composed of an admixture of a primary resin component, a wax component and a modifying resin component which serves to compatibilize and otherwise improve the properties of the primary resin and wax component. These hot melt resin compositions are used primarily in coating and adhesive applications. For example, in coating applications they are used to coat substrates such as cloth, paper or cardboard to provide a moisture and vapor impermeable coating or surface and in adhesive applications they are used to bond layers of paper or cardboard to form laminates of such materials which possess great strength as well as being impervious to water or moisture vapors. A particular requirement of these hot melt resinous compositions is that they have a desirable combination of melting points and viscosities or molten viscosity which permits them to be machine applied at high speed to the particular substrates. Aside from such basic properties, however, these resins must, as films or coatings, also have a combination of other suitable properties such as low water vapor transmissivity, strength, elasticity, glossiness, thermal stability, good adhesiveness and hot tack, as well as good color.

A hot melt resinous composition having a particularly desirable set of these properties is obtained according to this invention by utilizing the novel styrene-isobutylene copolymers as the modifying resin component of such resinous compositions in combination with the primary resin and the wax component. The primary resin component which can be combined with the wax component and the styrene-isobutylene copolymer to form the hot melt resinous compositions of this invention can include a wide variety of different materials. Generally, most of the materials commonly employed as the primary resin component of hot melt resins can be suitably utilized. Typically, these materials include polyethylenes, polypropylenes, ethylene-vinyl acetate copolymers or asphalts or various combinations thereof. Usually, ethylene-vinyl acetate copolymers are preferred as the primary resin component and suitable copolymers of ethylene and vinyl acetate which can be employed have a melt index in the range of 2.5 to 150 using the ASTM Procedure D–1238. These copolymers advantageously contain a vinyl-acetate monomer content in the range of from about 5 to 45 weight percent and more typically from about 15 to about 42 weight percent. The wax component which can be compounded with the primary resin component and with the styrene-isobutylene copolymer can be selected from a wide group of waxes and wax combinations. Suitable waxes include aliphtic hydrocarbon waxes, for example, paraffin waxes of various melting points ranging from about 130° F. to about 165° F.; microcrystalline and crystalline waxes having melting points of from about 165° F. to about 200° F.; natural vegetable waxes, such as carnauba or beeswax; or synthetic waxes such as hydrogenated castor oils or polyethylene oxides. Of the various waxes which can be utilized as the wax component, however, paraffins are generally preferred. This is especially the case when employed in combination with an ethylene vinyl-acetate copolymer as the primary resin, since the paraffins yield better moisture proofing and are generally lighter in color. Frequently, it is desirable to employ the paraffin wax in combination with microcrystalline waxes especially when increased adhesiveness is desired. These preferred paraffins have melting points in the range of about 145° F. to about 165° F.

The particular styrene-isobutylene copolymer compounded with the primary resin and wax component to form the hot melt resinous composition of this invention can be varied, with the particular copolymer employed being dependent upon such factors as the intended application of the resinous composition, for example coating or adhesive, the type of properties desired for such application, and the type of the wax and primary resin admixed with the copolymer. In general, the styrene-isobutylene copolymer used in the resinous compositions intended for both adhesive and coating applications should have a styrene content of from about 60 to about 85 weight percent styrene with a range of about 70 to 80 weight percent being preferred. Also, for both types of applications, the copolymer should have a certain molecular weight range. Usually this molecular weight should range from about 2000 to about 3200 with a range of from about 2100 to about 3000 generally being preferred to maximize the desired properties of the hot melt resinous composition containing the styrene-isobutylene copolymers. In association with these molecular weights the copolymer should also have a broad molecular weight distribution and in terms of the heterogeneity index $\overline{M}_w/\overline{M}_n$ the index should range from about 1.60 to about 2.10 with a range of from about 1.65 to about 2.00 being preferred. The ring and ball heat softening point for these styrene-isobutylene copolymers preferentially employed in the hot melt resinous composition of this invention usually range from about 180° F. to about 225° F. with a more limited range of from about 195° F. to 220° F. being especially preferred.

The particular formulation of the hot melt resinous composition of this invention in respect to the proportions of the primary resin component, the wax component and the styrene-isobutylene copolymer can be widely varied. The particular proportions for any formulation are selected depending upon such factors as: the intended application of the resinous composition, for example coating or adhesive; the desired properties of the resinous composition for such applications, for example hot tack, clarity or flexibility; and the particular wax, primary resin and styrene-isobutylene copolymer used. Usually for most hot melt resin applications, the styrene-isobutylene copolymer can constitute from about 10 to about 85 weight percent of the resinous composition. A more limited range of from about 20 to about 40 weight percent is especially preferred for resinous compositions where the primary resin component consists essentially of an ethylene-vinyl acetate copolymer and the wax component consists essentially of a paraffin. The amount of the wax component and primary resin component in the resinous composition can also be varied. Generally the quantity of the primary resin can range from about 1 to about 75 weight percent of the resinous composition with a range of about 15 to about 35 weight percent usually being preferred and the quantity of the wax component can range from about 20 to about 90 weight percent with a range of from about 25 to about 75 weight percent generally being preferred. If desired the resinous hot melt composition of this invention can contain other materials conventionally employed in hot melt resins such as dyes, pigments, oxidation inhibitors, ultra violet stabilizers or bactericides in addition to the primary resin component, the wax component and the styrene-isobutylene copolymers.

The hot melt resinous composition of this invention can be prepared or formulated by employing conventional resin blending procedures. These procedures typically involve mixing, blending or milling the components, if necessary under application of heat, in the desired respective proportion to obtain a substantially homogeneous, one phase or completely dispersed mixture. The hot melt resinous compositions thus prepared can be applied according to standard coating and adhesive techniques to such substrates as cloth, paper or cardboard to form moisture impermeable coatings or laminates of such materials having high strength and water vapor imperviousness.

As indicated, another useful application of the styrene-isobutylene copolymers of this invention is their utilization as a component of resinous compositions useful for pressure-sensitive adhesives. These pressure-sensitive adhesives may be defined as an adhesive material which adheres tenaciously upon application of only light finger pressure and can be removed cleanly from the surface upon which they are applied. These pressure-sensitive adhesives are used for a variety of different purposes. Most commonly, however, they are used to form pressure-sensitive adhesive tapes by application of the adhesive composition to a substrate tape comprising such materials as cloth, paper or a polymeric film. Typically, these pressure-sensitive adhesives are composed of an elastomer component and a tackifier component. In order that these adhesive materials be suitable as pressure-sensitive adhesives, they must possess the minimum requirements of wetting ability or "quick stick," good cohesiveness and good adhesiveness in the proper respective balance.

A pressure-sensitive, resinous adhesive composition having the proper balance of these properties is obtained according to this invention by utilizing the novel styrene-isobutylene copolymers as the tackifying component of such resinous compositions in combination with the elastomer component. The elastomer component which can be combined with the copolymer of this invention can include a wide variety of different materials. Generally, most of the materials commonly employed as the elastomer component of pressure-sensitive adhesives can be suitably utilized. Typically, these elastomer materials include rubbery materials such as reclaimed rubbers, natural rubber, styrene butadiene rubber, polyisobutylene or butyl rubber, or butadiene acrylonitrile rubber, block copolymer of styrene and butadiene or styrene and isoprene, or polyvinyl ethers and polyacrylate esters, or various combinations thereof. Of the various elastomeric materials which can be employed, the rubbery elastomers such as natural rubber are preferred.

The particular styrene-isobutylene copolymer compounded with the elastomer to form the pressure-sensitive adhesive compositions of this invention can be varied with the particular copolymer employed being dependent upon such factors as the intended adhesive application, the type of properties intended for such application and the type of elastomer compounded with the copolymer. In general, the styrene-isobutylene copolymer should have a styrene content of about 40 to about 75 weight percent with a range of from about 45 to 65 weight percent being preferred. The copolymer used should have a certain molecular weight range. Usually it should range from about 1500 to above 2500 with a range of from about 1800 to 2200 generally being preferred to maximize the desired properties of the pressure sensitive adhesive containing the styrene-isobutylene copolymer. In association with these molecular weights the copolymer should also have a broad molecular weight distribution. In terms of the heterogeneity index $\overline{M}_w/\overline{M}_n$, the copolymers should have an index ranging from about 1.60 to about 2.25 with a range of about 1.65 to about 2.15 generally being preferred. The ring and ball heat softening points for these styrene-isobutylene copolymers preferentially employed in the pressure-sensitive adhesive compositions of this invention usually range from about 125° F. to about 225° F. A more limited range is usually preferred, however, and ranges from about 130° F. to about 180° F.

The particular formulation of the pressure sensitive adhesive compositions of this invention in respect to the proportions of the copolymer tackifier and the elastomer can be widely varied. The particular proportions for any formulation, however, are selected in consideration of such factors as the intended adhesive application of the composition, the desired properties of the composition for such applications, for example, "quick stick," adhesiveness and cohesiveness, and the particular elastomer and copolymer utilized. Usually for most pressure sensitive adhesive applications, the styrene-isobutylene copolymer can constitute from about 20 to about 80 weight percent of the adhesive composition with an amount of from about 50 to about 75 weight percent being preferred. If desired, the adhesive compositions of the invention can contain other materials conventionally employed in pressure-adhesive compositions such as plasticizers, fillers and antioxidants.

The pressure-sensitive adhesive compositions of this invention can be prepared or formulated by employing conventional techniques. One typical procedure for preparing these compositions and especially those intended as a coating for flexible substrates to form pressure-sensitive adhesive tapes involves first forming solvent mixtures of the elastomer and the copolymer admixed in the desired weight ratio. The solvent mixture is then applied to a substrate employing standard coating techniques such as casting followed by drying to remove the solvent.

The following examples are offered to illustrate the novel copolymers of this invention, the method of preparation and resinous compositions containing the copolymers. They are not intended, however, to limit the invention to the particular copolymers, preparational procedures or resinous compositions illustrated.

EXAMPLE 1

A series of copolymers were prepared according to this invention by the following procedure:

Anhydrous hexane in an amount substantially equal in weight to the combined weight of the styrene and isobutylene to be polymerized was charged under a nitrogen atmosphere to a polymerization vessel equipped with an addition funnel, stirring and cooling means and an overhead condenser. The catalyst system was added by first charging a co-catalyst to the hexane with stirring followed by the addition of the primary catalyst consisting of freshly prepared substantially pure ethyl aluminum dichloride contained in heptane or hexane. After stirring for a period of time sufficient to insure adequate formation and dispersion of the catalyst system in the hexane, a premixed charge stream of styrene and isobutylene adjusted to the desired weight ratio was gradually added over a controlled addition time via the addition funnel while maintaining the desired polymerization temperature by cooling. After the addition was complete, the stirring was continued for a residence period sufficient to insure total and complete polymerization. The catalyst system was then removed by adding ethyl alcohol and solid calcium hydroxide to neutralize the catalyst system followed by adding an acid acting clay to adsorb the neutralized catalyst residue. After filtering the clay from the reaction mixture, the solvent and any side products produced during polymerization were removed by distillation under reduced pressure of about 1 mm. Hg at a temperature of about 225° C. The polymerization conditions employed for the preparation of the copolymers are summarized in the following Table I and the properties of these copolymers are summarized in Table II.

In Table II, the molecular weights reported were determined using Gel Permeation Chromatography techniques employing absolute molecular weight standards determined by Vapor Pressure Osmometry techniques. The thermal degradation temperature, that is the temperature at which the copolymer chemically decomposes under application of heat, was determined using Differential Scanning Calorimetry techniques. The heat softening point was obtained by the Ring and Ball Method of ASTM E28–58T.

TABLE I

| Copolymer number | Styrene/isobutylene monomer weight ratio | Primary catalyst weight percent based upon combined monomer weight | Co-catalyst Type | Co-catalyst Mol percent based upon mols primary catalyst | Polymerization temperature, °C. | Addition time, min. | Residence time, min. | Yield, percent |
|---|---|---|---|---|---|---|---|---|
| 1 | 50/50 | 1.0 | $H_2O$ | 20 | 20 | 70 | 60 | 96 |
| 2 | 50/50 | 0.5 | $H_2O$ | 5-10 | 20 | 60 | 180 | 96 |
| 3 | 50/50 | 0.5 | $H_2O$ | 10 | 10-32 | 60 | 90 | 96.7 |
| 4 | 50/50 | 0.5 | $H_2O$ | 7 | 20 | 60 | 60 | 92.0 |
| 5 | 50/50 | 0.5 | $H_2O$ | 7 | 20 | 60 | 60 | 94.5 |
| 6 | 50/50 | 0.5 | $H_2O$ | 5 | 20 | 40 | 60 | 96.0 |
| 7 | 60/40 | 0.5 | $H_2O$ | 5 | 20 | 30 | 60 | 95 |
| 8 | 60/40 | 0.5 | $H_2O$ | 5 | 20 | 30 | 60 | |
| 9 | 60/40 | 0.5 | $H_2O$ | 10 | 20 | 65 | 60 | 89 |
| 10 | 60/40 | 0.5 | $H_2O$ | 5 | 20 | 65 | 61 | |
| 11 | 65/35 | 0.5 | $H_2O$ | 5 | 20 | 60 | 60 | 94.2 |
| 12 | 65/35 | 0.5 | $H_2O$ | 5 | 20 | 60 | 60 | 94 |
| 13 | 65/35 | 0.5 | $H_2O$ | 5 | 20 | 30 | 60 | 97.5 |
| 14 | 70/30 | 0.25 | $H_2O$ | 10 | 20 | 60 | 60 | 96 |
| 15 | 70/30 | 0.5 | $H_2O$ | 5 | 20 | 50 | 60 | 95 |
| 16 | 70/30 | 0.5 | $H_2O$ | 5 | 20 | 30 | 60 | 92.5 |
| 17 | 70/30 | 0.5 | $H_2O$ | 3 | 20 | 60 | 60 | 93.5 |
| 18 | 70/30 | 0.5 | $H_2O$ | 5 | 20 | 60 | 60 | 95 |
| 19 | 75/25 | 1.0 | t-Bu Cl | 20 | 20-25 | 65 | 60 | 92 |
| 20 | 75/25 | 0.25 | t-Bu OH | 20 | 20-25 | 25 | 60 | 98.6 |
| 21 | 75/25 | 1.0 | $H_2O$ | 10 | 20 | 30 | 60 | 83 |
| 22 | 75/25 | 0.5 | $H_2O$ | 5 | 19-22 | 27 | 60 | 99 |
| 23 | 75/25 | 1.0 | $H_2O$ | 2.5 | 19-23 | 29 | 60 | |
| 24 | 75/25 | 1.0 | $H_2O$ | 10 | 19-20 | 30 | 60 | 97 |
| 25 | 75/25 | 0.5 | $H_2O$ | 7 | 19-20 | 30 | 120 | 99 |
| 26 | 75/25 | 0.25 | $H_2O$ | 10 | 18-23 | 30 | 120 | 96 |
| 27 | 75/25 | 0.5 | $H_2O$ | 2.5 | 19-24 | 35 | 120 | |
| 28 | 80/20 | 0.5 | $H_2O$ | 7.5 | 20-23 | 60 | 120 | 96 |
| 29 | 80/20 | 0.5 | $H_2O$ | 5 | 19-21 | 60 | 120 | |

TABLE II

| Copolymer number | Weight average molecular weight, $\bar{M}_w$ | Number average molecular weight, $\bar{M}_n$ | Heterogeneity index, $\bar{M}_w/\bar{M}_n$ | Heat softening point, °F. | Thermal degradation, °C. | Appearance |
|---|---|---|---|---|---|---|
| 1 | 3,600 | 2,100 | 1.71 | 134 | | Clear, water white. |
| 2 | 4,525 | 2,450 | 1.84 | 141 | | Do. |
| 3 | 3,350 | 1,750 | 1.91 | 127 | | Do. |
| 4 | 3,450 | 2,000 | 1.72 | 130 | | Do. |
| 5 | 3,825 | 2,075 | 1.84 | 130 | | Do. |
| 6 | 3,875 | 2,100 | 1.84 | 134 | | Do. |
| 7 | 4,250 | 2,000 | 2.12 | 147 | | Do. |
| 8 | 3,875 | 2,000 | 1.93 | 163 | | Do. |
| 9 | 4,125 | 2,150 | 1.91 | 173 | | Do. |
| 10 | 4,175 | 2,150 | 1.91 | 164 | | Do. |
| 11 | 4,000 | 2,100 | 1.90 | 180 | | Do. |
| 12 | 4,175 | 2,100 | 1.98 | 179 | | Do. |
| 13 | 4,000 | 2,150 | 1.86 | 174 | | Do. |
| 14 | 4,550 | 2,650 | 1.71 | 201 | 397 | |
| 15 | 5,150 | 2,850 | 1.80 | 197 | 412 | |
| 16 | 4,350 | 2,225 | 1.95 | 204 | | Do. |
| 17 | 4,725 | 2,275 | 2.07 | 195 | | Do. |
| 18 | 4,175 | 2,705 | 2.01 | 197 | | Do. |
| 19 | 3,350 | 1,250 | 2.68 | | | Clear, yellowish. |
| 20 | | | | | | Do. |
| 21 | 4,550 | 2,200 | 2.07 | 215 | 401 | Clear, water white. |
| 22 | 4,575 | 2,700 | 1.69 | 205 | 399 | Do. |
| 23 | 4,875 | 2,450 | 1.98 | 207 | 400 | Do. |
| 24 | 4,650 | 2,400 | 1.93 | 207 | 402 | Do. |
| 25 | 4,575 | 2,400 | 1.90 | 209 | 382 | Do. |
| 26 | 4,475 | 2,325 | 1.92 | 206 | 367 | Slight haze, water white. |
| 27 | 4,925 | 2,400 | 2.05 | | | Do. |
| 28 | 3,975 | 2,125 | 1.87 | 213 | 367 | Do. |
| 29 | 5,250 | 2,750 | 1.90 | 218 | 402 | Clear, slight yellow. |

EXAMPLE 2

To demonstrate the random nature of the copolymers of this invention the following example is cited. A copolymer was degraded using lauryl peroxide and the degradation products were analyzed according to the following procedure:

About 50 grams of hexane, and 4.0 grams of lauryl peroxide were charged to a sealed flask together with about 50 grams of copolymer No. 27 of Example 1. This copolymer analyzed by nuclear magnetic resonance spectroscopy was composed of 77.87 weight percent styrene. The mixture was heated at 70° C. for about 20 hours. During this period samples of the mixture were taken at intervals of 1, 2, 4 and 20 hours. The individual samples were filtered through a column of an acid acting clay to remove acidic compounds and the filtrate was distilled at 1 to 4 mm. Hg pressure to a pot temperature of 225° C. The distilled samples were then analyzed by infrared spectroscopy for structural characteristics. The infrared spectra of all of the samples were substantially the same. This indicated that the copolymer is essentially random in nature and has no block copolymer characteristics of large blocks of polystyrene or polyisobutylene or any graft polymer characteristics of substantial chains of either polystyrene or polyisobutylene grafted to a backbone of the other.

EXAMPLE 3

To demonstrate the random nature of the copolymers of the present invention, the homogeneity of the resin composition and the unexpected compositional variation in the molecular weight fractions, samples of copolymers prepared by the present process were fractionated (A) by mixed solvent precipitation and (B) by extraction with solvents of varying polarity, as follows:

*Procedure A.*—To a five percent solution of the copolymer resin in benzene, methanol was added dropwise until an opalescent solution was obtained. The precipitated resin was allowed to settle and the supernatant liquid was decanted. The precipitated resin was washed with methanol and dried. The methanol solution was added dropwise to the decanted supernatant solution to obtain another opalescent solution. Repeated precipitation and isolation of resin samples from solvent mixtures containing increasing methanol concentration were carried out to give the results obtained in Table III for two resins prepared by the method of this invention.

*Procedure B.*—A two percent suspension of copolymer resin of the present invention in isopropyl alcohol was refluxed for one hour. The hot alcohol solution was decanted from the insoluble portion of the copolymer sample. The hot isopropyl alcohol solution was allowed to stand overnight at room temperature to precipitate the insoluble portion of the resin sample. The precipitated resin sample was filtered. The filtrate was concentrated to dryness to obtain an alcohol soluble fraction. The results obtained by this procedure are reported in Table III.

TABLE III

|  | Percent styrene | Molecular weight |
|---|---|---|
| Procedure A: |  |  |
| Copolymer No. 1 analysis | 73.1 | 4,675 |
| Fraction: |  |  |
| 1 | 71.2 | 6,375 |
| 2 | 74.5 | 5,300 |
| 3 | 72.4 | 4,075 |
| 4 | 72.4 | 3,625 |
| 5 | 72.4 | 2,850 |
| 6 | 71.2 | 2,700 |
| Copolymer No. 2 analysis | 75.0 | 4,350 |
| Fraction: |  |  |
| 1 | 77.9 | 12,090 |
| 2 | 77.2 | 6,375 |
| 3 | 75.1 | 4,675 |
| 4 | 75.1 |  |
| 5 | 72.9 | 3,625 |
| 6 | 69.5 | 3,000 |
| Procedure B: |  |  |
| Copolymer No. 3 analysis | 71.3 | 4,350 |
| Fraction: |  |  |
| 1 | 74.1 | 5,500 |
| 2 | 73.7 | 3,180 |
| 3 | 70.9 | 2,000 |

EXAMPLE 4

The copolymers of Example 1 were utilized to prepare hot melt resinous compositions by blending the respective copolymer with a primary resin and a wax. The primary resin component consisted essentially of an ethylene-vinyl acetate copolymer (Elvax 250, Du Pont) having an inherent viscosity of 0.85 at 30° C. (0.25 g./100 ml. toluene) and a vinyl-acetate monomer content of about 27 to 29 weight percent. The wax component consisted essentially of a paraffin (Humble Oil, Parvan 5010) having an ASTM melting point of about 151° F. The components were blended to form a hot melt resinous composition containing different proportions of the three components and as resins were subjected to several different tests to demonstrate their suitability as hot melt resinous compositions. The different resinous compositions prepared and their properties are summarized in the following Table IV. The data reported in Table IV were obtained using the following generalized test procedures:

(A) Preparation of Resin Formulation

The desired quantity of the wax component was charged to a stainless steel vessel maintained at a temperature of about 335° F. When the temperature of the wax was about 315° F., the appropriate quantity of the styrene-isobutylene copolymer was added with stirring, followed by the addition of the appropriate quantity of the primary resin. The resinous material was then maintained at such temperature for about 1.5 to 2 hours with stirring to form a homogeneous mixture.

(B) Thermal Stability

A sample of the molten resin prepared as in Part A above, was placed in an elongated, small diameter glass tube. The glass tube was then sealed and placed in a heated chamber maintained at 325° F. and stored under such conditions for a period of about 1 hour. At the end of the period, the resin was observed for any phase separation of the three resin components.

(C) Tensile and Elongation

A cast of the resin was prepared and strip samples measuring 5 inches in length, 0.5 inch in width and having a thickness of about 125 mils were obtained substantially according to the general procedure of ASTM 0638–64–T, Type I. The samples were then tested on an "Instron Tester" using a CT Cell (5–250 lb.), a crosshead speed of 2 in./min., and a jaw gap of 2 inches.

(D) Film Characteristics

A thin film of the resin of Part A was prepared and was evaluated by hand for flexibility, elasticity, and toughness on a scale of good (G), fair (F), and poor (P).

(E) Molten Viscosity

The viscosities of the formulations were obtained using a Contraves Rheometer Viscometer (Viscotemp, VT model) equipped with a measuring beaker heated by recirculating oil.

(F) Moisture Vapor Transmission

A paper substrate (glassine) was coated with the particular resinous composition at a rate of from about 8 to 12 pounds of the resinous composition per ream and the moisture vapor transmission rate was determined using a Honeywell Water Vapor Transmission tester.

TABLE IV

| Copolymer number | Resin formulation, weight percent | | | Film characteristics | | | Molten viscosity at 300° F., centipoise | Tensile (p.s.i.) | | Elongation percent rupture | Moisture vapor transmission, g. H₂O/ 24 hr./ 100 in.² | Thermal stability at 325° F., 1 hr. partial phase separation |
|---|---|---|---|---|---|---|---|---|---|---|---|---|
| | Copolymer | Wax | Primary resin | Flexibility | Elasticity | Toughness | | Nominal | Rupture | | | |
| 14 | 33 | 50 | 17 | F | F | F | 444 | 470 | 478 | 17 | | No phase separation. |
| 15A | 33 | 50 | 17 | G | G | G | 566 | 496 | 496 | 11 | | Partial phase separation. |
| 15B | 33 | 33 | 33 | G | G | G | 8,210 | 567 | 566 | 40 | | No phase separation. |
| 15C | 20 | 50 | 30 | G | G | G | 2,370 | 572 | 556 | 41 | | Do. |
| 21 | 33 | 50 | 17 | P | P | F | | 516 | 516 | 88 | | Do. |
| 22 | 33 | 50 | 17 | F | F | F | 463 | 442 | 442 | 13 | | Partial phase separation. |
| 23A | 33 | 33 | 33 | G | G | G | 8,892 | 614 | 598 | 43 | | No phase separation. |
| 23B | 20 | 50 | 30 | G | G | G | 2,162 | 536 | 508 | 33 | <1 | Do. |
| 24A | 33 | 50 | 17 | G | G | F | 481 | 431 | 431 | 10 | | Do. |
| 24B | 33 | 33 | 33 | G | G | G | 7,604 | 548 | 519 | 40 | <1 | Do. |
| 25A | 33 | 50 | 17 | F | P | G | 4,823 | 475 | 458 | 21 | | Slight phase separation. |
| 25B | 33 | 33 | 33 | F | P | P | 7,063 | 619 | 534 | 47 | | No phase separation. |
| 26A | 33 | 50 | 17 | P | P | P | 518 | 481 | 481 | 13 | | Do. |
| 26B | 33 | 33 | 33 | G | G | G | 7,874 | 545 | 534 | 39 | <1 | Do. |
| 28 | 33 | 50 | 17 | F | F | F | 566 | 572 | 556 | 41 | | Slight phase separation. |
| 29 | 20 | 50 | 30 | G | G | G | 2,618 | 538 | 505 | 33 | | No phase separation. |

EXAMPLE 5

The copolymers of Example 1 were utilized to prepare pressure-sensitive adhesive resinous compositions by blending the respective copolymer with an elastomer and the compositions thus prepared were used to form pressure-sensitive flexible tapes according to the following procedures:

Natural rubber stock (No. 1 Pale Crepe) was milled to a Mooney viscosity (ML 1+4 at 212° F.) of 45 to 50 and was then dissolved in heptane to provide a concentration of 10 to 20 percent solids. This mixture was then combined with the appropriate amount of a heptane solution of the particular copolymer containing 20 percent solids to provide the desired weight ratio of the copolymer to the rubber in the combined heptane mixture. This combined mixture containing the adhesive composition of the copolymer and the rubber elastomers was then applied to a thin flexible tape (Mylar, 1.5 mils). The coated tape was then dried to provide a solvent-free film thickness for the adhesive composition ranging from about 1 to 2 mils. The dried tape was then subjected to certain tests to demonstrate the suitability of the composition of the copolymer and the elastomer as a pressure-sensitive adhesive. The results of these tests are summarized in Table V. The tests employed were conducted according to the standardized tests promulgated by the Pressure Sensitive Tape Council, Glenview, Illinois, U.S.A. These tests were:

Peel Adhesion, P.S.T.C.—No. 1
Holding Power, P.S.T.C.—No. 7
Quick Stick, P.S.T.C.—No. 5

In the aging test at 200° F., samples of the tape were placed in an oven and maintained at 200° F. for seven days. At the end of the period, the tape samples were examined for any loss of tack or discoloration of the adhesive composition.

TABLE V

| Copolymer number | Weight ratio, copolymer/elastomer | Peel adhesion 180° F., oz./in. | Holding power, min. | Quick stick oz./in. | 7-day aging at 200° F. |
|---|---|---|---|---|---|
| 1 | 2/1 | 33 | 165 | 23 | No change. |
| 7 | 2/1 | 17 | ¹3,240 | 5.5 | Do. |
| 8 | 2/1 | 16.5 | ²3,240 | 2 | Do. |
| 11 | 2/1 | 12 | ³3,240 | 0 | Do. |

¹ 17/32 in. creep at termination.
² 9/16 in. creep at termination.
³ 1/16 in. creep at termination.

We claim:

1. A hot melt resinous composition comprising an admixture of from about 10 to about 40 weight percent of the copolymer of styrene and isobutylene prepared by gradually contacting styrene and isobutylene in a proportion of from about 40 to 90 weight percent styrene at a polymerization temperature of from about 10° C. to about 50° C. in the presence of a hydrocarbon solvent with a catalyst system of an alkyl aluminum dihalide primary catalyst and at least one co-catalyst selected from the group consisting of water, an alcohol, an alkyl halide and a hydrogen halide, in an amount of from about 2 to about 30 mol percent based upon the mols of the primary catalyst, maintaining the sytrene and isobutylene in reactive contact with the catalyst system for a time sufficient to insure complete polymerization, and thereafter recovering the desired copolymer, from about 25 to about 75 weight percent of wax and from about 15 to about 35 weight percent of a primary resin selected from the group consisting of polyethylene, polypropylene, ethylene-vinyl acetate copolymer, asphalt or combinations thereof.

2. The composition of Claim 1 wherein the copolymer has a number average molecular weight of from about 2000 to about 3200.

3. The composition of Claim 1 wherein the copolymer has a styrene content of from about 60 to about 85 weight percent.

4. The composition of Claim 1 wherein the copolymer has a heterogeneity index of from about 1.60 to about 2.10.

5. The composition of Claim 1 wherein the copolymer has a ring and ball heat softening point of from about 180° F. to about 225° F.

6. The composition of Claim 1 wherein the copolymer has a number average molecular weight of from about 2000 to about 3200, a styrene content of from about 60 to about 85 weight percent, a heterogeneity index of from about 1.60 to about 2.10 and a ring and ball heat softening point of from about 180° F. to about 225° F.

7. The composition of Claim 1 wherein the primary resin is polyethylene.

8. The composition of Claim 1 wherein the primary resin is an asphalt.

9. The composition of Claim 1 wherein the primary resin is ethylene-vinyl acetate copolymer.

10. The composition of Claim 1 wherein the wax is a paraffin.

11. The composition of Claim 6 wherein the primary resin is ethylene-vinyl acetate copolymer.

12. The composition of Claim 1 wherein the styrene-isobutylene copolymer has a number average molecular weight of from about 2100 to about 3000, a heterogeneity index of from about 1.65 to about 2.00, a styrene content of from about 70 to 80 weight percent, and a ring and ball heat softening point of from about 190 to about 220° F.

13. The composition of Claim 12 wherein the primary resin is ethylene-vinyl acetate and the wax is a paraffin.

(References on following page)

References Cited

UNITED STATES PATENTS

| | | | |
|---|---|---|---|
| 2,683,138 | 7/1954 | Goering | 260—28.5 A |
| 2,580,050 | 12/1951 | Sparks | 260—28.5 A |
| 2,593,381 | 4/1952 | Young | 260—28.5 A |
| 2,595,911 | 5/1952 | Young | 260—28.5 A |
| 2,655,492 | 10/1953 | Young | 260—28.5 A |
| 2,274,749 | 3/1942 | Smyers | 260—86 |
| 2,877,196 | 3/1959 | Reding | 260—28.5 AV |
| 2,730,519 | 1/1956 | Leary | 260—88.2 C |
| 2,213,423 | 9/1940 | Wiezevich | 260—4 AR |
| 2,643,993 | 6/1953 | Tegge | 260—88.2 C |

ALLAN LIEBERMAN, Primary Examiner

P. R. MICHL, Assistant Examiner

U.S. Cl. X.R.

260—4 R, 28.5 AV, 28.5 AS, 888, 896